United States Patent Office 3,546,758
Patented Dec. 15, 1970

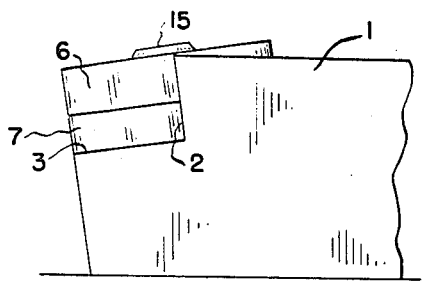
FIG. 1
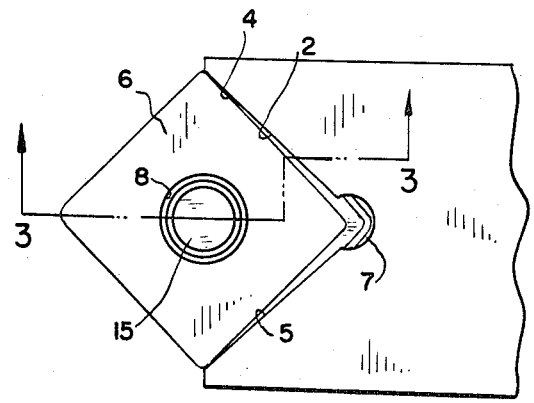
FIG. 2
FIG. 3
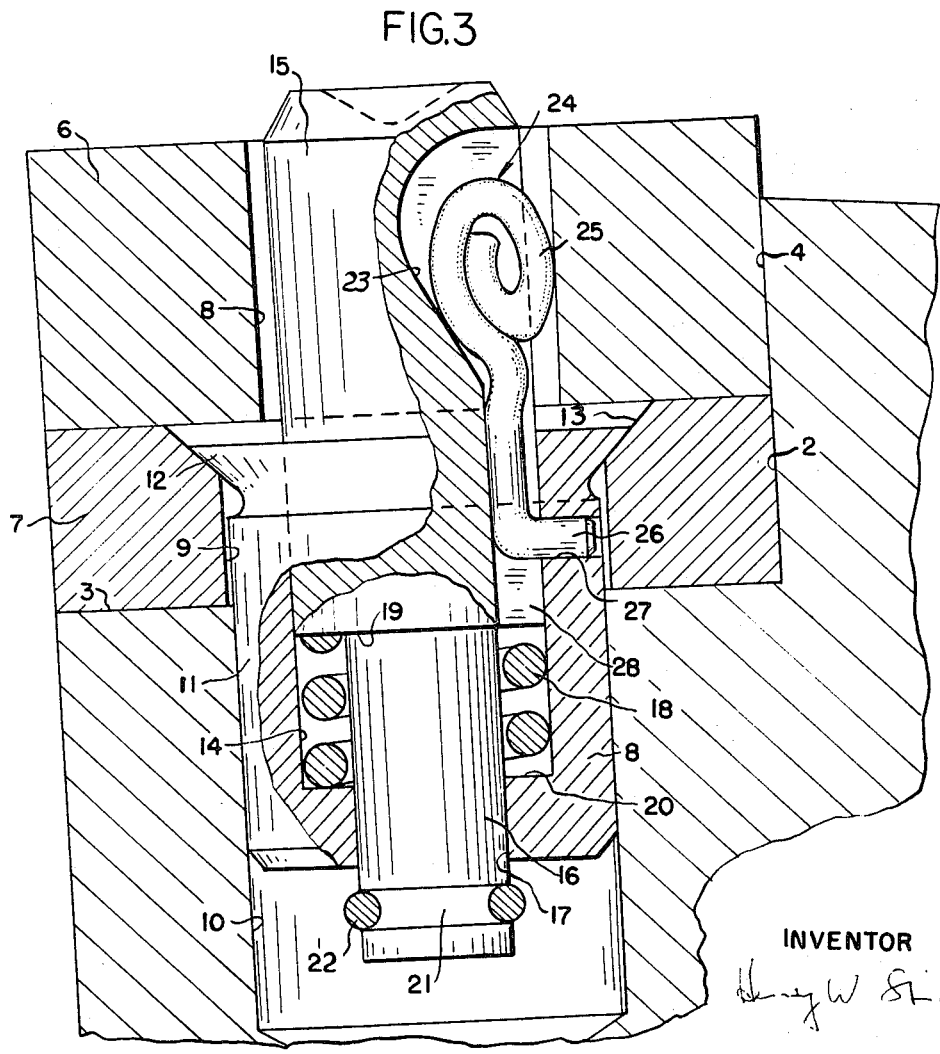
INVENTOR
Henry W Stier

1

3,546,758
CUTTING TOOLS
Henry W. Stier, Dearborn Heights, Mich., assignor to Howmet Corporation, Greenwich, Conn., a corporation of Delaware
Filed Oct. 2, 1968, Ser. No. 764,528
Int. Cl. B26d 1/00
U.S. Cl. 29—96                                         7 Claims

ABSTRACT OF THE DISCLOSURE

Cutting tools having a support member provided with a recess adapted to removably receive a cutting bit and means for holding the cutting bit in the recess, such means comprising essentially a mounting aperture in the cutting bit, a pin slidably disposed in the mounting aperture and in an aligned aperture in the bottom of the recess, a lateral inclined wedging surface on the portion of the pin disposed in the cutting bit mounting aperture, a wedging member in engagement with the wedging surface, and biasing means for urging the pin in a direction that causes wedging engagement of the wedge member between the wedging surface and a portion of the surface of the mounting aperture of the cutting bit.

BACKGROUND OF THE INVENTION

The present invention belongs to the field of cutting tools which comprise in combination a support member or holder and a removable cutting insert or cutting bit supported in a recess disposed on one end of the support member of holder.

Cutting tools generally disclosed in the prior art include appropriate means for holding a removable, sometimes indexable, cutting bit in position in a recess or pocket in the support member or holder. The means provided for holding the cutting bit in position in the support member or holder includes clamping means, set screws, holding bolts, eccentric pins and like arrangements, which are designed to hold the cutting bit in the tool holder with the lower face of the cutting bit firmly applied to the bottom surface of the recess or pocket in the holder, or alternately in construction where an anvil or shim is disposed between the bottom surface of the pocket and the cutting bit to the upper surface of the anvil or shim. Additionally, the holding or clamping means for removable cutting bits disposed in a pocket or recess in a support member or holder are often designed so as to firmly apply at least one side surface of the cutting bit with a side wall of the recess or pocket. As a result, such holding or clamping means often consist of many independent parts cooperating with each other, they are costly to manufacture, are subject to breakage and failure, and ordinarily do no permit adjustment of the intensity and direction of the clamping forces. Furthermore, such holding and clamping means as found in the prior art require the use of tools for manipulating the holding or clamping means, and the operator has a tendency to tighten the holding or clamping mechanism with a greater force than is actually necessary to hold the cutting bit on the holder, which leads to breakage or deterioration of the mechanical holding device.

SUMMARY OF THE INVENTION

My present invention provides a structure which permits clamping and holding a cutting bit in an appropriate recess or pocket in a support member or holder with a minimum amount of cooperating elements, with no obstruction or interfering parts projecting from the cutting bit or from the support member, which effectively clamps the cutting bit in a receiving recess or pocket with the correct amount of force necessary for holding the cutting bit in position, and which requires no tool for manipulating the clamping and holding means. This is accomplished in my present invention by providing as a clamping and holding means a wedging member cooperating with an inclined wedging surface formed on a pin slidably disposed in aligned mounting apertures in the cutting bit and the bottom surface of the bit receiving recess in the holder. A biasing means, such as a spring, normally holds the wedging member in wedging engagement between the inclined wedging surface of the pin and the surface of the mounting aperture in the cutting bit. In order to release the cutting bit for removal from the pocket for replacement by a new cutting bit or for indexing to a fresh cutting edge, the slidable pin is simply depressed by hand against the biasing action of the spring so as to free the wedging member, thus permitting removal of the cutting bit.

The amount of clamping pressure required for holding a cutting bit in a recess or pocket on a tool holder is relatively small in view of the fact that the cutting forces exerted on the cutting bit during normal use of the cutting tool are applied in a direction that tends to urge the cutting bit in engagment with the supporting surfaces formed by the bottom surface of the recess and at least one side wall of the recess. Consequently, there is no need for clamping and holding means subjecting the cutting bit to a substantial clamping force, and the holding means provided by the present invention provides sufficient holding action to maintain the cutting bit in position in the pocket under all circumstances.

The many objects and advantages of my invention will become apparent to those skilled in the art when the following description of an example of practical embodiment of my invention is read in conjunction with the accompanying drawings. The example of my invention hereinafter described in detail is given for illustrative purpose only, and not in any restrictive manner whatsoever, for the purpose of explaining the principle of my invention.

BRIEF DESCRIPTION OF THE DRAWINGS

FIG. 1 is a side elevation view of an example of a cutting tool according to my invention;
FIG. 2 is a top plan view thereof; and
FIG. 3 is a sectional view substantially along line 3—3 of FIG. 2.

DETAILED DESCRIPTION OF THE PREFERRED EMBODIMENT

Referring now generally to FIGS. 1-2, my invention comprises a support member or holder 1, for mounting on a machine lathe or the like, provided on one end with a recess 2 forming a bottom surface 3 and, in the example illustrated, a pair of side walls 4 and 5, best seen in FIG. 2. The cutting insert or bit 6 which, in the example shown, is a square-shaped cutting insert or bit, is disposed in the recess 2 with a pair of lateral faces of the cutting bit engaging the side walls 4 and 5 of the recess 2 and a cutting tip or edge exposed for engagement with a workpiece (not shown). An anvil or shim 7, having a shape generally conforming to the shape of the cutting bit 6, is preferably placed between the bottom or supporting surface 3 of the recess and the bottom face of the cutting bit. The cutting bit 6 is made of a hard material such as a cemented carbide or the like and the anvil 7 is made of a similar material.

The cutting bit 6 is provided with a centrally disposed mounting aperture 8, best seen in FIGS. 2 and 3, the shim 7 being similarly provided with a mounting aperture 9. The support member 1 has a bore 10 generally normal to the bottom surface 3 of the recess 2 and having its axis generally aligned with the axis of the mounting apertures 8 and 9 of, respectively, the cutting bit 6 and the shim 7. A cylindrical sleeve member 11 is passed through the aligned apertures 8 and 9 and has a lower portion engaging the bore 10 in the support member 1 in a press fit manner. The sleeve member 11 has an enlarged shoulder portion 12 which, in the example shown, is tapered or frustoconical, and which is disposed in engagement with a countersink 13 forming an enlarged diameter portion of the aperture 9 in the shim 7, such countersink being disposed toward the bottom face of the cutting bit. Alternately, the enlarged diameter portion of the aperture 9 may be shaped as an annular recess adapted to be engaged by an annular shoulder portion (not shown) on the peripheral surface of the sleeve member 11. In this manner, the shim 7 is held securely in position when the sleeve member 11 is forced into the bore 10 in the support member or holder 1.

The sleeve member has an internal longitudinal bore 14 adapted to slidably receive a pin member 15, which, in the example shown, is provided with a bottom end portion 16 of reduced diameter adapted to slidably project through a reduced diameter portion 17 at the bottom and as shown in the drawings, of the sleeve member 11. Around the reduced diameter portion 16 of the pin member 15 is disposed a coil spring 18 normally compressed between an annular shoulder 19 forming the transition between the normal diameter portion of the pin member 15 with the reduced diameter portion 16 thereof and the annular end surface 20 of the sleeve member 11. Proximate the end of the reduced diameter portion 16 of the pin member there is an annular groove 21 in which is placed a retainer ring 22, or the like, for holding the sleeve member 11 and the pin member 15 in assembly together with the spring 18 disposed where shown.

The portion of the pin member 15 loosely disposed within the mounting aperture 8 in the cutting bit has an inclined wedging surface 23 adapted to receive a wedging member 24 which, in the example shown, consists of a spring wire having an end, as shown at 25, bent over in a tight loop so as to define a wedging portion normally disposed between the inclined wedging surface 23 in the pin member 15 and a portion of the surface of the mounting aperture 8 in the cutting bit 6. The other end of the spring wire is bent at right angle as shown at 26 and is engaged in a radially disposed bore or aperture 27 through the wall of the sleeve member 11. The spring wire wedging member 24 is formed in such manner that its natural spring back tendency is in the direction that tends to apply the appropriate portion of the wedging portion 25 in engagement with the inclined surface 23, an appropriate longitudinal groove 28 being formed in the pin member 15 so as to afford passage to the body of the wedging member 24. It is obvious that the wedging member 24 may be made in other shape than the one herein illustrated, as will be readily apparent to those skilled in the art.

For placing a cutting bit or insert 6 in position in the recess or pocket 2 in the holder 1, the pin member 15 is manually depressed against the biasing action of the spring 18, and the cutting bit is located in the pocket 2 against the upper surface of the anvil or shim 7. The pin member 15 is then released and is urged upwardly, as seen in the drawings, under the action of coil spring 18, such that the enlarged head or wedging portion 25 of the wedging member 24 becomes wedged between the inclined wedging surface 23 in the pin member 15 and the surface of the mounting aperture 8 in the cutting bit, as a result of the wedging member 24 being held stationary relatively to the sleeve member 11 because of its bent over bent portion 26 being engaged in aperture 27 in the sleeve member 11. Consequently, the cutting bit 6 is held in position in the pocket, with at least one of its side surfaces, and, in the example illustrated, with both side surfaces engaging the side walls 4 and 5 of the recess 2.

It is obvious that in some tool constructions, the shim 7 may be omitted, and that, if so desired, the arrangement of the elements may be reversed, that is, the pin member 15 may be normally urged in a downward direction as a result, for example, disposing the spring 18 below the sleeve member 11, in which case the inclined wedging surface 23 in the pin member 15 is disposed so as to be inclined toward the upper end of the pin 15, contrary to the orientation as shown in the drawing, rather than towards the lower end of the pin member as herein illustrated. Such an arrangement requires providing means for manually displacing the pin member 15 in an opposite direction to the one hereinbefore described for the purpose of releasing the cutting bit 6 by, for example, forming an access aperture at the bottom of the longitudinal bore 10 through the bottom of the holder 1 so as to permit a rod or the like to be introduced through such access aperture for displacing the pin member upwardly, for releasing the cutting bit, rather than downwardly as hereinbefore explained.

Having thus described my invention by way of a typical example of practical embodiment thereof, modification whereof will be apparent to those skilled in the art, what I claim as novel and sought to be protected by United States Letters Patent is as follows:

1. A cutting tool arrangement comprising in combination a support member, a recess having a bottom and disposed on one end of the support member adapted to removably receive a cutting bit, a cutting bit disposed in the recess with a portion thereof exposed for cutting engagement with a workpiece, said cutting bit being provided with a mounting aperture, and means for holding the cutting bit in the recess characterized by an aperture in the bottom of the recess substantially aligned with the mounting aperture in the cutting bit, a pin member slidably disposed in the aligned apertures, a laterally inclined wedging surface at the end of said pin engaged in the mounting aperture in the cutting bit, a wedge member having a wedging portion disposed in engagement with the inclined wedging surface of the pin and an end held against displacement in a direction generally parallel to the axis of the pin, and biasing means arranged for axially urging the pin in a direction causing wedging of the wedging portion of the wedge member between the inclined wedging surface of the pin and a surface of the mounting aperture in the cutting bit.

2. The arrangement of claim 1 in which the wedge member comprises a spring wire having an end bent over in a tight loop for defining the wedging portion thereof and another bent substantially at right angle for engagement in an aperture disposed substantially radially relatively to the aperture in the bottom of the recess.

3. The arrangement of claim 1 further comprising a shim disposed below the cutting bit in the recess.

4. The arrangement of claim 1 further comprising a shim disposed below the cutting bit in the recess, an aperture in the shim aligned with the mounting aperture in the cutting bit and the aperture in the bottom of the recess, an enlarged diameter portion in the shim aperture disposed toward the cutting bit, a sleeve member frictionally engaging the aperture in the bottom of the recess, a shoulder portion on the periphery of one end of the sleeve member engaging the enlarged diameter portion of the shim, and an axial bore in the sleeve member for slidably receiving the pin member.

5. The arrangement of claim 1 in which the wedging action of the wedging member holds the cutting bit in engagement with a bottom surface of the recess and at least one side wall of the recess.

6. The arrangement of claim 4 in which the wedging action of the wedging member holds the cutting bit in engagement with the shim and at least one side wall of the recess.

7. The arrangement of claim 4 in which the biasing means consist of a coil spring disposed in compression between a shoulder portion of the pin member and a shoulder portion of the sleeve member about a reduced diameter portion of the pin member.

References Cited
UNITED STATES PATENTS 3,456,315    7/1969    Stier _____ 29—96

HARRISON L. HINSON, Primary Examiner